United States Patent [19]
Miyazawa et al.

[11] Patent Number: 5,432,574
[45] Date of Patent: Jul. 11, 1995

[54] SINGLE LENS REFLEX CAMERA WITH COLLAPSIBLE LENS

[75] Inventors: Azuma Miyazawa; Atushi Maruyama; Takeshi Ito, all of Tokyo, Japan

[73] Assignee: Olympus Optical Co., Ltd., Tokyo, Japan

[21] Appl. No.: 292,603

[22] Filed: Aug. 18, 1994

Related U.S. Application Data

[63] Continuation of Ser. No. 994,145, Dec. 21, 1992, abandoned.

[30] Foreign Application Priority Data

Dec. 25, 1991 [JP] Japan .................. 3-342571

[51] Int. Cl.⁶ .............................. G03B 17/04
[52] U.S. Cl. .................................... 354/187
[58] Field of Search ................ 354/187–194, 354/195.1, 195.12

[56] References Cited

U.S. PATENT DOCUMENTS

| | | | |
|---|---|---|---|
| 4,336,986 | 6/1982 | Prochnow | 354/187 |
| 4,827,296 | 5/1989 | Haraguchi et al. | 354/187 |
| 4,958,178 | 9/1990 | Yoshida et al. | 354/195.12 |
| 5,086,311 | 2/1992 | Naka et al. | 354/195.1 |
| 5,153,626 | 10/1992 | Yamamoto | 354/187 |
| 5,227,831 | 7/1993 | Miyazaki et al. | 354/412 |

FOREIGN PATENT DOCUMENTS

| | | |
|---|---|---|
| 55-52041 | 4/1980 | Japan . |
| 61-16049 | 4/1986 | Japan . |
| 63-109934 | 7/1988 | Japan . |
| 2-109338 | 8/1990 | Japan . |
| 3-34739 | 7/1991 | Japan . |

Primary Examiner—David M. Gray
Attorney, Agent, or Firm—Frishauf, Holtz, Goodman & Woodward

[57] ABSTRACT

A single-collapsible-lens reflex camera includes a lens barrel designed such that it is moved forward into shooting position from the camera body when in use and at least its part is collapsed in the camera body when not in use. A shutter release button is provided to shoot a subject when pressed. Electromagnets for controlling the leading and following curtains of a focal plane shutter are deenergized before the shutter release button is pressed and energized when the button is pressed. A mirror drive member raises or lowers a movable reflex mirror when a subject is shot and the lens barrel is collapsed. A shutter charging member moves the focal plan shutter in the direction that charges the focal plane shutter in synchronism with the operation of the mirror driving member to raise the mirror and in the direction that discharges the shutter in synchronism with the operation of the discharges driving member to raise the mirror. A control circuit deenergizes the shutter leading-curtain controlling electromagnet when the mirror is raised, deenergizes the shutter following-curtain electromagnet after a length of time depending on the intensity of light reflected from a subject to be photographed, and keeps the leading-curtain and following-curtain controlling electromagnets deenergized when the mirror is raised to collapse the lens barrel. Thereby, the shutter is shifted to the non-charged state as it is closed when the lens barrel is collapsed.

9 Claims, 17 Drawing Sheets

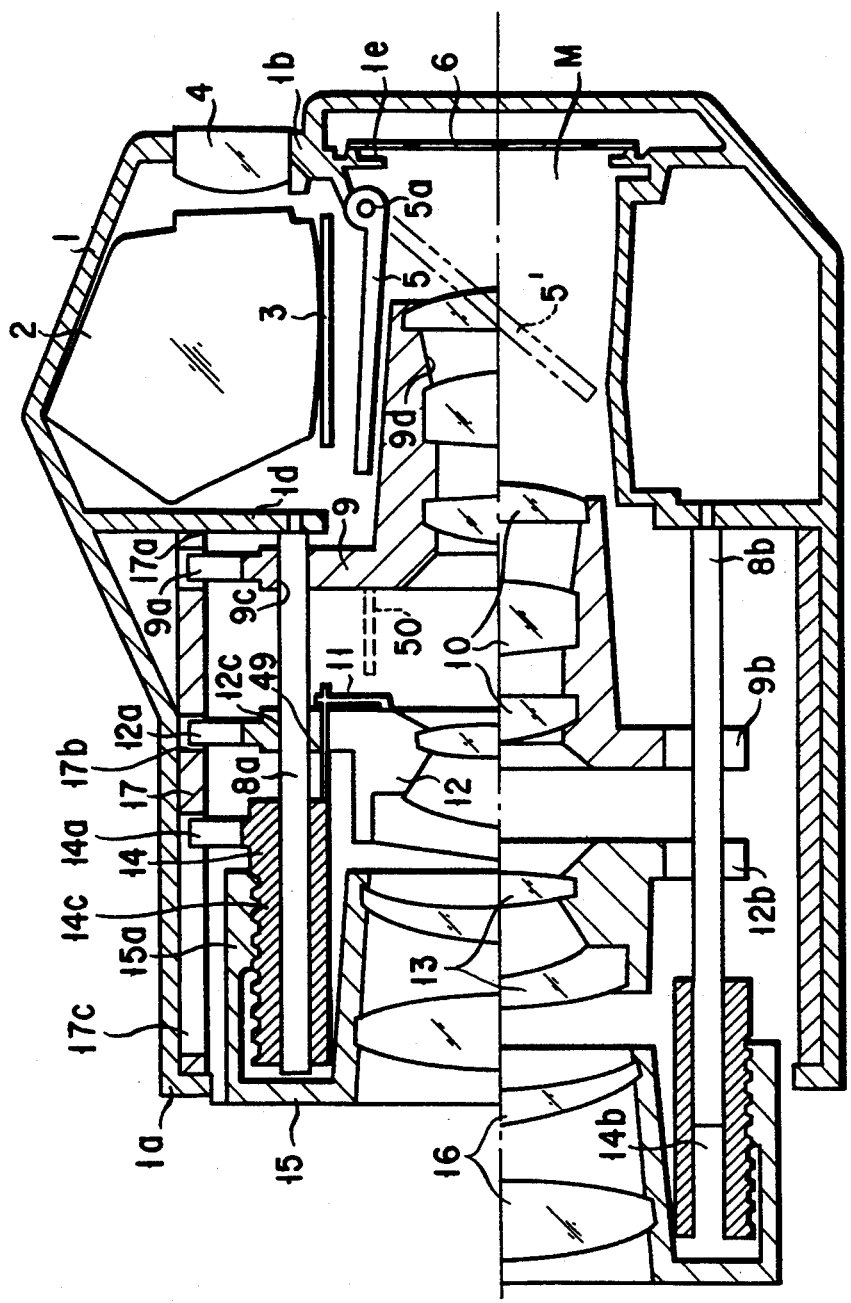
F I G. 1

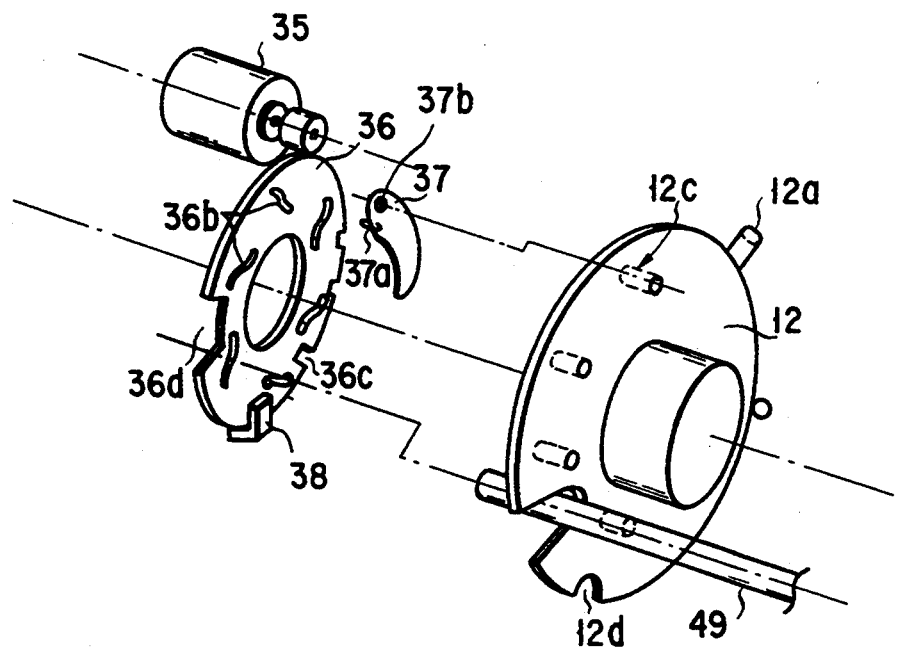
F I G. 2A
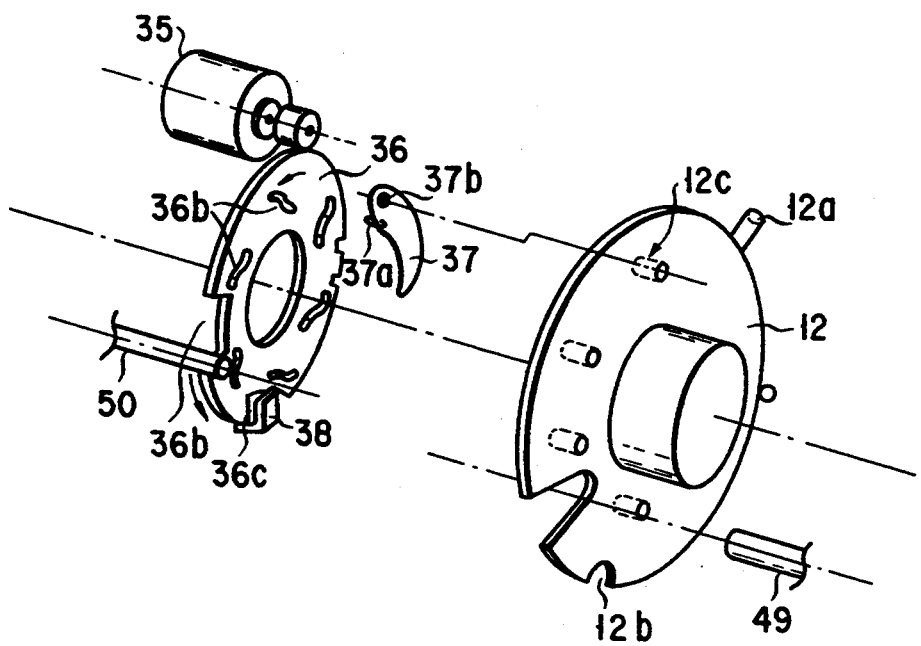
F I G. 2B

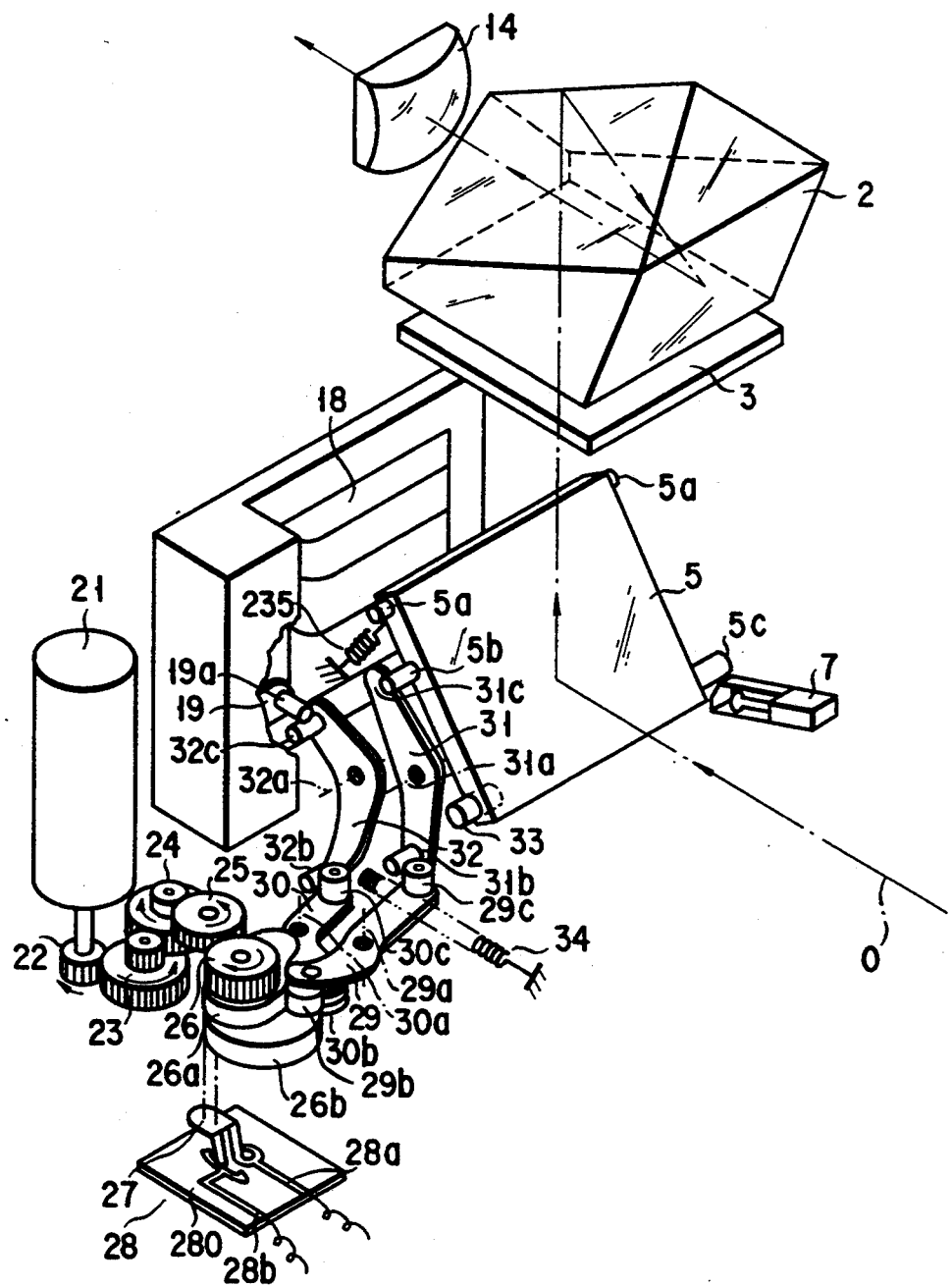
F I G. 3

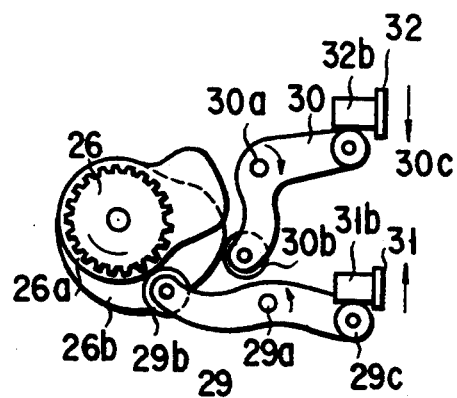
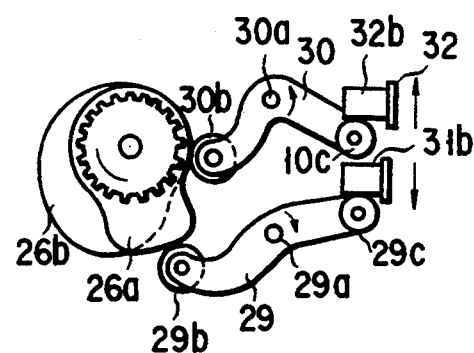
FIG. 4A  FIG. 4B
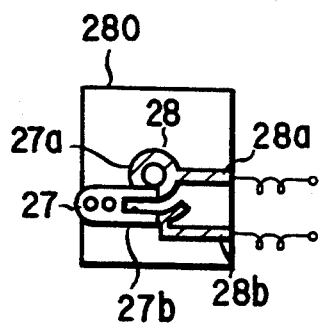
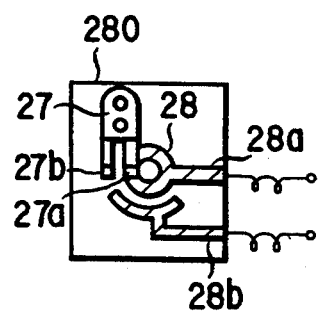
FIG. 5A  FIG. 5B

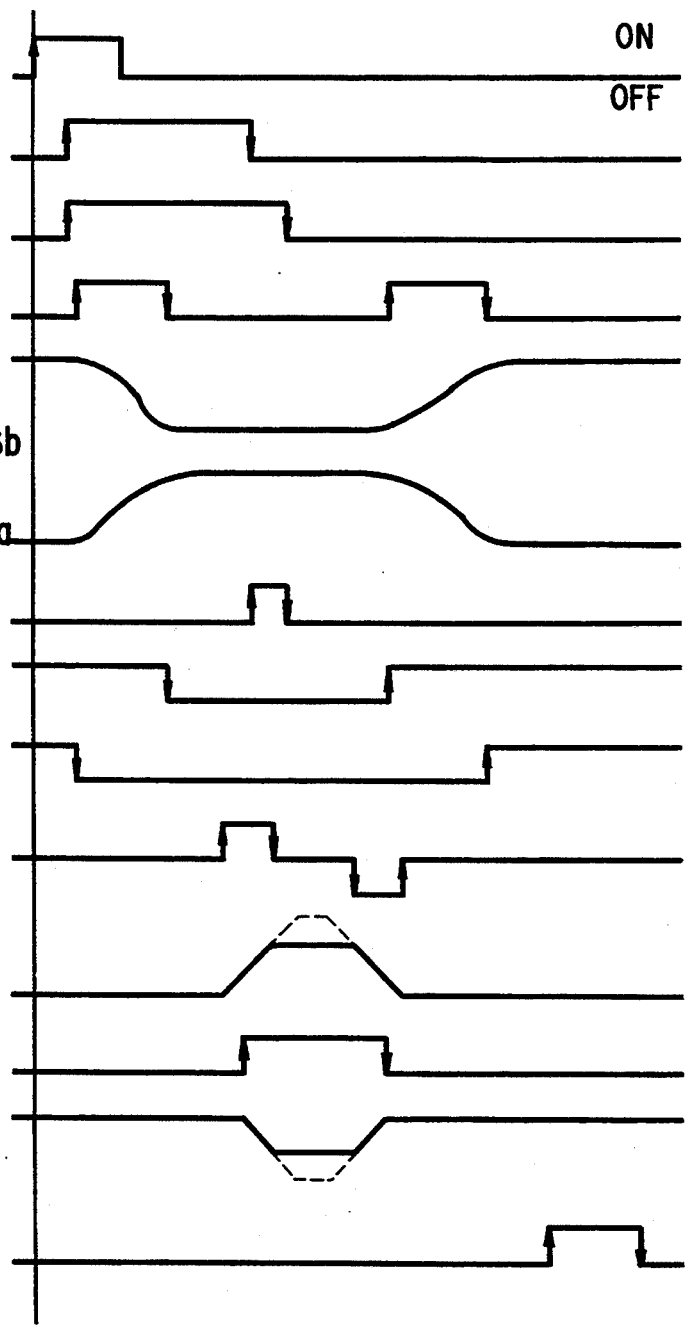

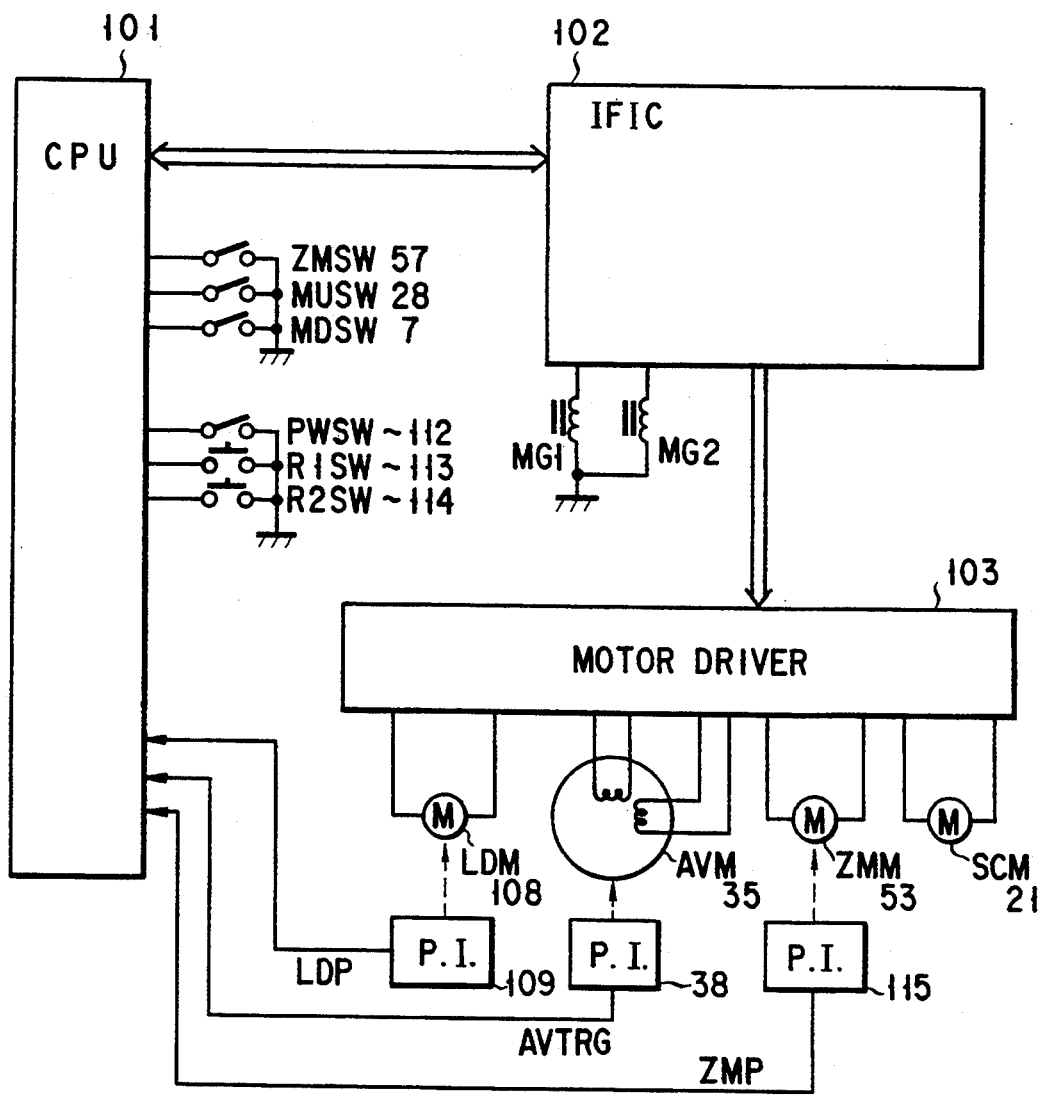
F I G. 11

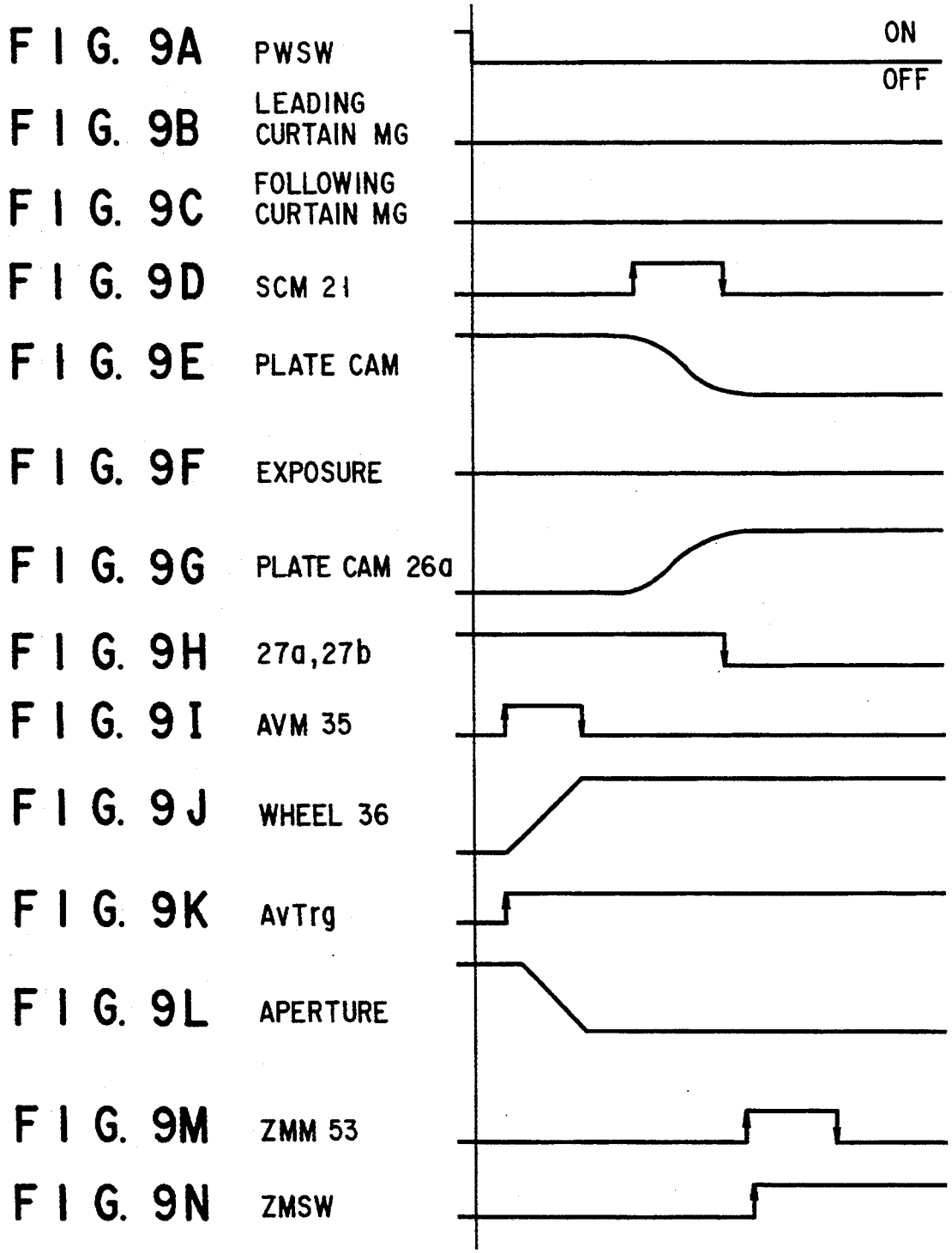

SWITCH STATUS TABLE

| STATUS / TYPE | ON | OFF |
|---|---|---|
| ZMSW | COLLAPSED POSITION | SHOOTING POSITION |
| MUSW | —— | MIRROR UP |

FIG. 12A

DISABLED OPERATION

|  | ZMSW | MUSW |
|---|---|---|
| NO COLLAPSING | ON | ON |
| NO MIRROR OPERATION | ON | —— |

FIG. 12B

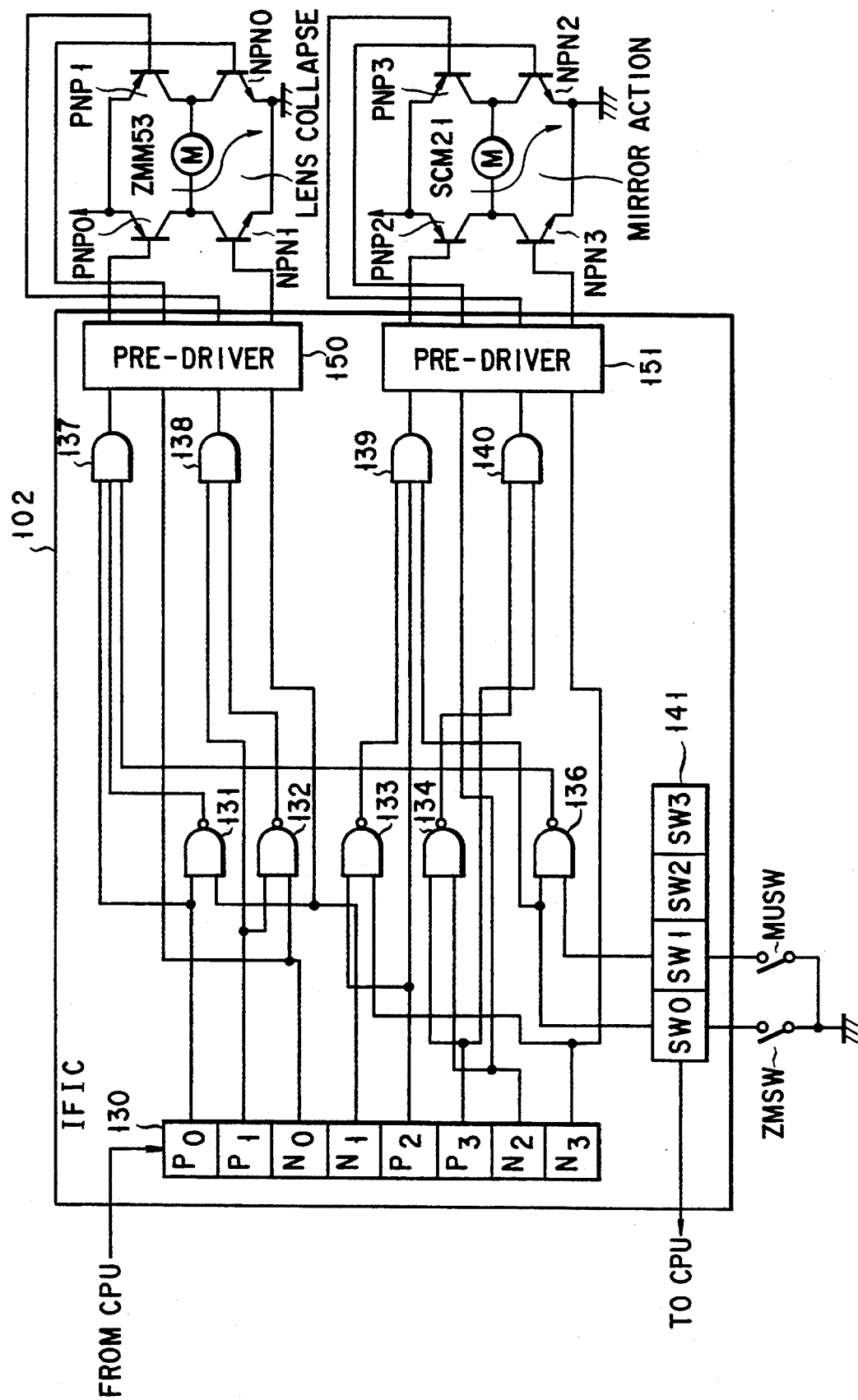
F I G. 13

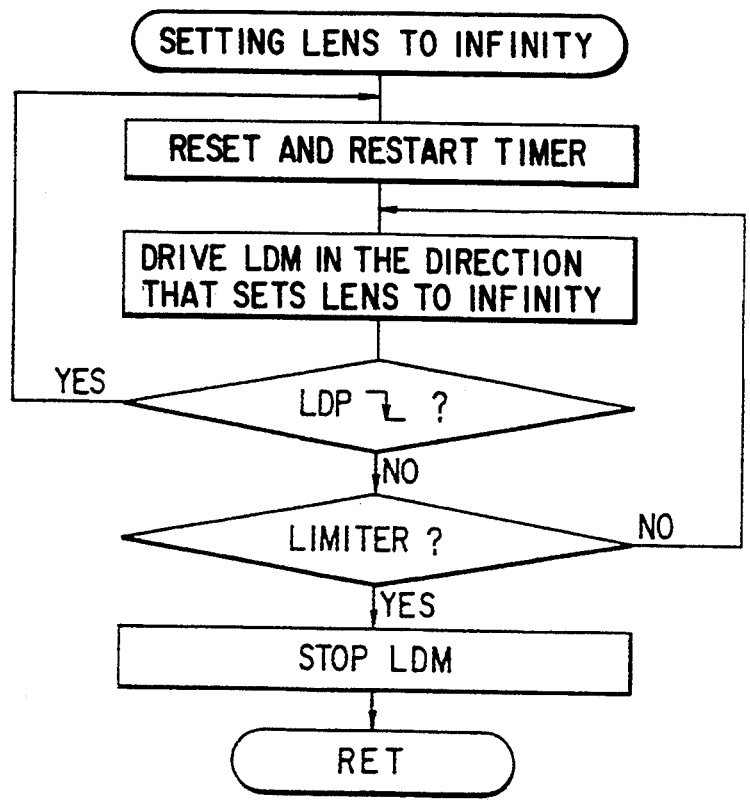
F I G. 17
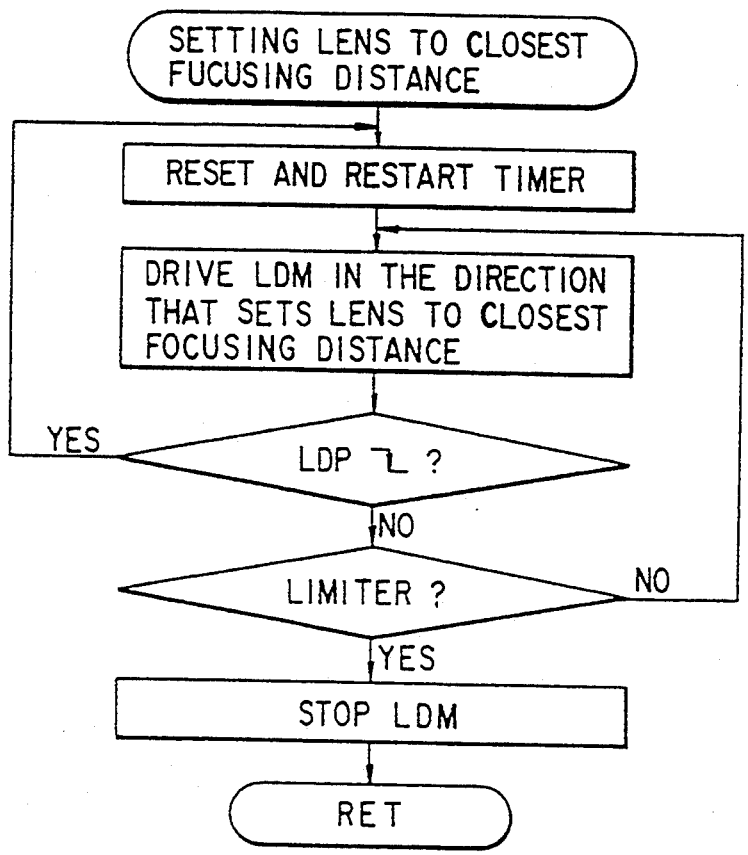
F I G. 18

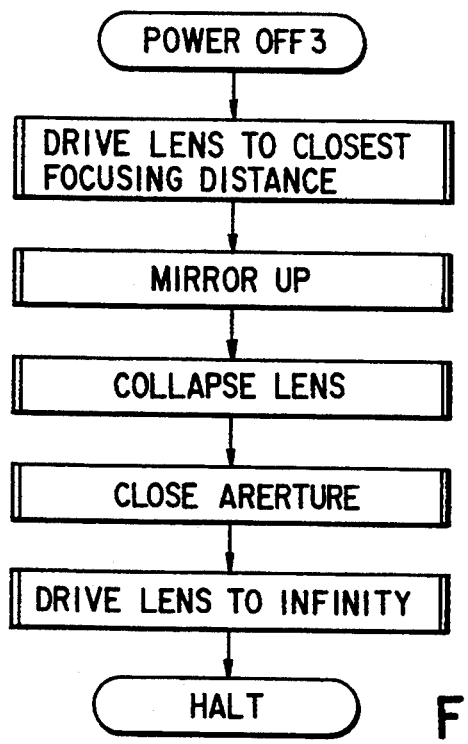
F I G. 21
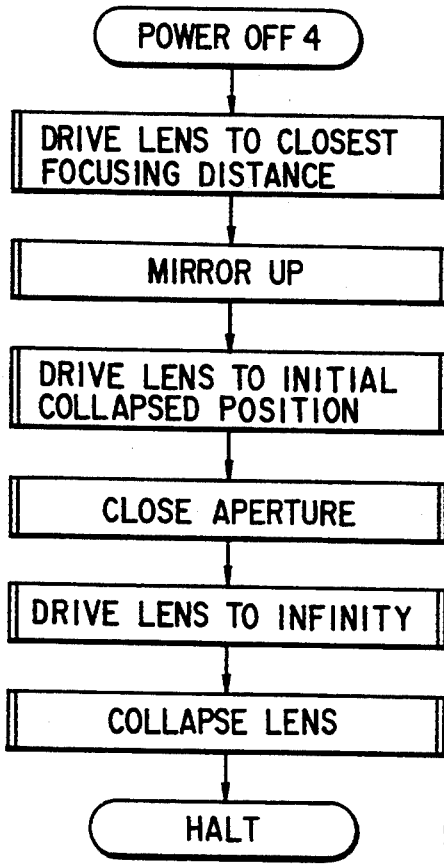
F I G. 22

SINGLE LENS REFLEX CAMERA WITH COLLAPSIBLE LENS

This application is a Continuation of application Ser. No. 07/994,145, filed Dec. 21, 1992 abandoned.

BACKGROUND OF THE INVENTION

1. Field of the Invention

The present invention relates to a single-lens reflex camera with a collapsible lens and, more particularly, to a single-lens reflex camera in which a part of the phototaking lens is retracted in a mirror box space evacuated by a reflex mirror so that the camera can be made compact when it is not used.

2. Description of the Related Art

A single-collapsible-lens reflex camera is disclosed in Japanese Unexamined Patent Publication No. 2-109338, in which a reflex mirror is raised at the same time a main switch is turned OFF, thereby permitting the lens to be collapsed in the mirror box.

In an exposure sequence as used in general single-lens reflex cameras, shutter curtains are first spring-charged and then arrested by mechanical arresting members. The shutter curtains are next electrically held by energizing shutter-curtain holding electromagnets in response to a release signal, and the shutter curtains are then released from being mechanically arrested and held only electrically after mirror up is started. The electromagnets are deenergized at a predetermined time to thereby cause the shutter curtains to run. In collapsing the lens in the camera body in such single-lens reflex cameras, if the shutter is kept charged, then the electromagnets will be energized unnecessarily, leading to a waste of power. If the mirror is raised prior to the collapse of the lens, the leading and following curtains will be caused to run rapidly by spring force when the mechanical arresting members are released. A noise made at that time would cause the camera user to make a mistake of judging that the shutter was released or would give the user an unpleasant feeling.

SUMMARY OF THE INVENTION

It is accordingly an object of the present invention to provide a single-collapsible-lens reflex camera which overcomes the above-mentioned drawbacks.

It is the other object of the present invention to provide a single-collapsible-lens reflex camera which permits noise made by the shutter at the time of collapsing the lens to be suppressed at a very low level.

To attain the objects a single-collapsible-lens reflex camera according to the present invention comprises:

- a lens barrel designed such that it is moved forward from a camera body into shooting position when in use and at least its part is collapsed in said camera body when not in use;
- a shutter release button for enabling a shooting operation;
- electromagnets for controlling leading and following curtains, respectively, of a focal plane shutter, said electromagnets remaining deenergized before said shutter release button is pressed and being energized when said shutter release button is pressed;
- a movable reflex mirror;
- mirror driving means for raising or lowering said reflex mirror when a subject is shot and said lens barrel is collapsed;
- shutter charging means for moving said focal plan shutter in a direction that charges said focal plane shutter in synchronism with an operation of said mirror driving means to lower said reflex mirror and for moving said focal plane shutter in a direction that releases said focal plane shutter in synchronism with an operation of said mirror driving means to raise said reflex mirror; and
- control circuit means for deenergizing said leading-curtain controlling electromagnet first when said reflex mirror is raised, deenergizing said following-curtain controlling electromagnet next after a predetermined length of time depending on the intensity of light reflected from said subject, and keeping said leading- and following-curtain controlling electromagnets deenergized when said reflex mirror is raised to collapse said lens barrel in said camera body,
- whereby said focal plane shutter is shifted to non-charged state as it is closed following movement of said shutter changing means when said lens barrel is collapsed in said camera body.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a longitudinal sectional view of a first embodiment of a single-collapsible-lens reflex camera according to the present invention;

FIGS. 2A and 2B illustrate diaphragm mechanisms in first and third embodiments;

FIG. 3 is a diagram for use in explanation of mirror driving and shutter charging systems; FIGS. 4A and 4B are enlarged views illustrating the operation of the plate cam of FIG. 3;

FIGS. 5A and 5B are detail views of the conductive armature and the MU switch shown in FIG. 3;

FIGS. 8A through 8N are a timing diagram for use in explanation of a normal shooting sequence;

FIGS. 9A through 9N are a timing diagram for use in explanation of the lens collapsing operation;

FIG. 11 is a block diagram of an electric system used in the camera;

FIGS. 12A and 12B are diagrams for use in explanation of a method of preventing the mirror against destruction;

FIG. 13 is a diagram for use in explanation of the manner in which the internal logic of the IFIC of FIG. 11 disables the motors from operation;

FIG. 17 is a flowchart for the operation of driving the focusing lens to infinity;

FIG. 18 is a flowchart for the operation of driving the focusing lens to the closest focusing distance;

FIG. 21 is a flowchart for the operation of the third embodiment;

FIG. 22 is a flowchart for the operation of the fourth embodiment; and

DETAILED DESCRIPTION OF THE PREFERRED EMBODIMENTS

Figure 6:
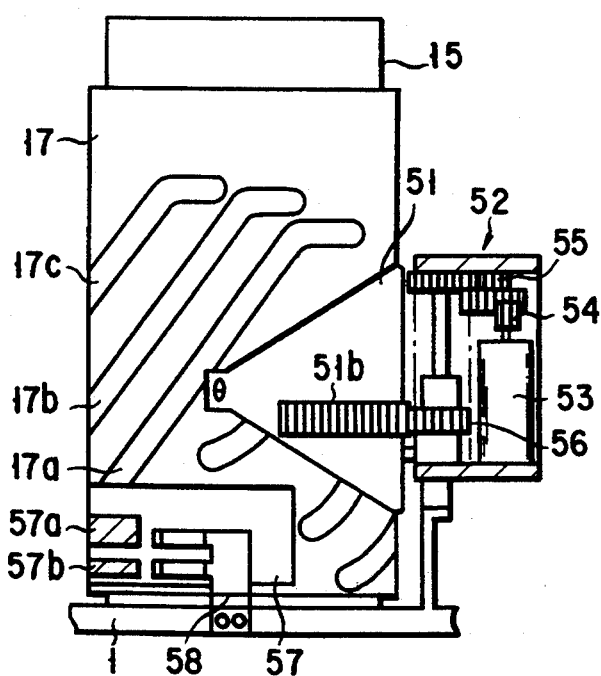
FIG. 6 illustrates the driving system for zooming and collapsing operations and the cam ring.

Hereinafter, reference will be made to the accompanying drawings to describe the structure of a camera according to a first embodiment of the present invention and a normal shooting operation of the camera.

First, the structure will be described. In a camera shown in FIG. 1, the upper half portion of a lens system above its optical axis is indicated collapsed, while the lower half portion below the optical axis is indicated set in a shooting state. The camera includes a camera body 1, a lens driving cam ring 17 supported within a lens barrel 1a located in the front of the camera body 1, a supporting rod 8a fixed to a rod fixing member 1d of the camera body 1, a rotation stopping rod 8b fixed to be opposed to the supporting rod 8a, lens groups slidably supported by the rods 8a and 8b, a rotatable reflex mirror 5 disposed in a mirror box M in the central portion of the camera body 1, a film window 1e in the rear of the mirror box M, and viewfinder optical systems 2, 3 and 4 disposed in the upper portion of the camera body 1. The camera is further equipped with a mirror driving system, a zoom driving system, a shutter charging system, a diaphragm driving system, and a focal plane shutter, which are not shown in FIG. 1 but shown in FIGS. 2A through 7. In FIG. 1, 6 denotes a film.

The lens system is composed of a first lens group 16, a second lens group 13 and a third lens group 10. The first lens group 16 is supported by the inner barrel of a focusing frame 15 consisting of a double barrel. The inner surface of the outer barrel of the focusing frame 15 is provided with helicoid threads 15a for meshing with helicoid threads 14c of a first-lens-group driving frame 14.

The driving frame 14 has its upper portion supported by the supporting rod 8a so that it can slide along the optical axis. A through hole 14b is bored in the lower portion of the driving frame, opposite to that upper portion, along the optical axis. The rotation stopping rod 8b is inserted into the through hole 14b, thereby preventing rotation of the driving frame 14 on the optical axis. The driving frame 14 is provided at its upper portion with a cam follower 14a consisting of a pin that erects radially. The cam follower 14a engages with a first-lens-group cam 17c consisting of a cam slot formed in the cam ring 17. Thus, the rotation of the cam ring 17 or the focusing frame 15 permits the first lens group 16 to move along the optical axis.

The second lens group 14 is supported by a second-lens-group frame 12. The lens frame 12, like the driving frame 14, is supported slidably by the supporting rod 8a and the rotation stopping rod 8b which are respectively inserted into a through hole 12c and a groove 12b of the frame. A cam follower 12a provided in the upper portion of the frame 12, consisting of a pin erecting radially, engages with a second-lens-group shifting cam slot 17b cut in the cam ring 17. A diaphragm mechanism 11 is associated with the second lens group. The third lens group 10 is supported by a collapsing frame 9, which, like the second-lens-group frame 12, has a through hole 9c and a groove 9b into which the supporting rod 8a and the rotation preventing rod 8b are inserted, respectively, so that it can slide along the optical axis. The frame 9 is further provided with a cam follower 9a consisting of a pin erecting radially, which engages with a third-lens-group shifting slot 17a cut in the cam ring 17. Thus, the rotation of the cam ring 17 permits the second-lens-group supporting frame 12 and the lens collapsing frame 9 to shift along the optical axis. The mirror 5 has its pivot 5a supported by a mirror supporting member 1b of the camera body 1. The rotatable mirror 5, indicated by solid lines in FIG. 1, is in the mirror up state, i.e., it is evacuated from the shooting optical path. On the other hand, the mirror 5', indicated by broken lines, is lowered to the shooting optical path, i.e., it is placed in the shootable state. The viewfinder optical system comprises a focusing screen 3, a pentaprism 2 and an eyepiece 4. In viewing subjects through the viewfinder, the mirror 5 is down, and light reflected from the mirror enters the pentaprism 2 through the focusing screen 3 and then reflected by the prism onto the eyepiece 2.

Figure 10A:
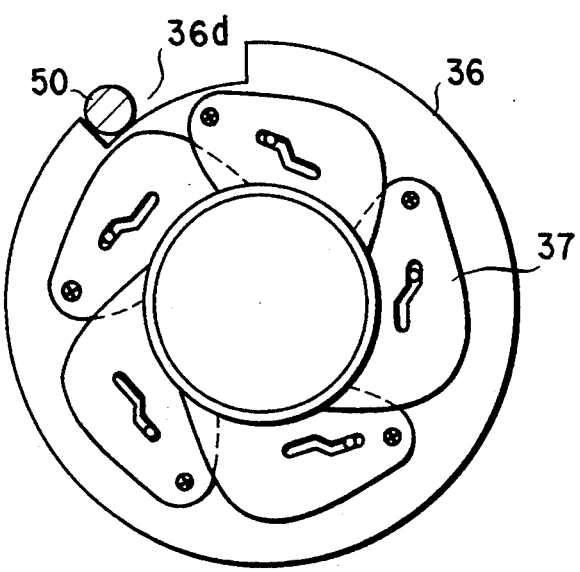
FIGS. 10A, 10B and 10C illustrate various aperture states of a diaphragm.
Figure 10B:
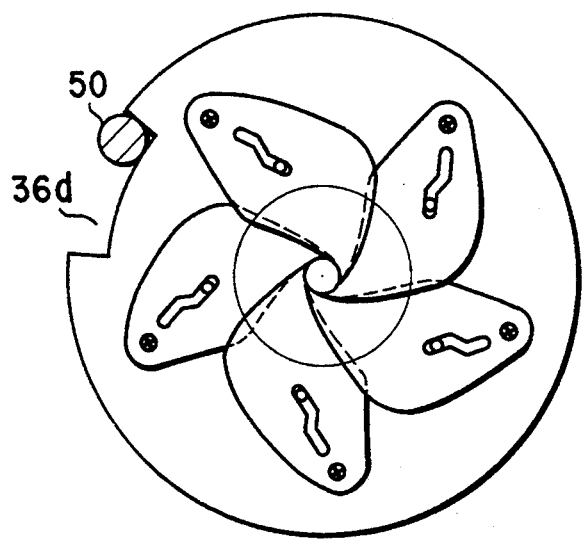
Figure 10C:
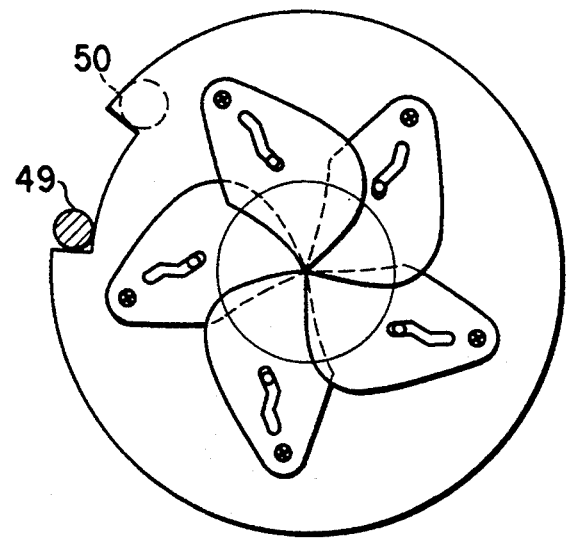

FIG. 2A illustrates the diaphragm mechanism 11 associated with the second-lens-group supporting frame 12. The second-lens-group supporting frame 12 is provided with dowels 12c each of which is inserted into a hole 37b in a diaphragm blade 37 so that the blade can rotate on the dowel. Diaphragm blades 37 are placed to overlap each other as shown in FIG. 10, thereby forming a diaphragm. The diaphragm can be controlled freely to provide various aperture (lens opening) states such as the fully open state shown in FIG. 10A, the minimum aperture state shown in FIG. 10B and the fully closed state shown in FIG. 10C. The diaphragm blade 37 is provided with a driving pin 37a which engages with a cam groove 36b of a driving wheel 36. As is well known, an angle of rotation of the wheel 36 provides a corresponding aperture value.

A pulse motor AVM 35 adapted to drive the wheel 36 is attached to the second-lens-group supporting frame 12. The wheel 36 is provided with a notch 36c for controlling its angles of rotation. A rotation detecting switch AvTrSW 38, consisting of a photo interrupter, is attached to the second-lens-group supporting frame 12.

The wheel 36 is rotatably attached to the second-lens-group supporting frame by means of a thrust radial bearing not shown. The diaphragm blade 37 can be set in any position from the open position to the light interrupting position. The driving wheel 36 is provided with another notch 36d. The first-lens-group 14 is provided with a stopper pin 49 which is positioned to oppose the notch 36d.

FIG. 3 illustrates the mirror driving system and the shutter charging system. SCM 21 denotes a motor adapted to charge the shutter and drive the mirror. A pinion 22 is fixed to the motor shaft. The rotation of the motor is transmitted to an intermediate gear 25 through reduction gears 23 and 24. A mirror driving plate cam 26a and a shutter charging plate cam 26b which are integrally attached to a cam driving gear 26 meshing with the gear 25. To the underside of the plate cam 26b is attached a conductive armature 27 which rotates while sliding on a board 280. A first driving lever 29, which is rotatable around its pivot 29a, is disposed in the neighborhood of the plate cam 26a. To one end of the first lever is attached rotatably a small roller 29b which slides on the cam surface of the mirror driving plate cam 26a. A small roller 29c is also attached rotatably to the other end of the first lever 29.

A mirror driving lever 31 which is rotatable on a pivot 31a is provided in the neighborhood of the mirror 5. To the lower end of the mirror driving lever is fixed a pin 31b that abuts on the small roller 29c of the first driving lever 29. The mirror 5, which is lowering on a pivot 5a, is normally pulled down by a mirror downing spring 235 having its end fixed to an unmovable member not shown. In viewfinder observing states, the mirror 5 abuts on a mirror positioning pin 33. When the mirror driving lever 31 is rotated clockwise on the pivot 31a, its upper end 31c forces up a pin 5b positioned a little to the upper end of the side of the mirror, thereby raising the mirror 5. The mirror 5 is further provided with a protrusion 5c which is adapted to render a mirror-down detecting switch MDSW 7 conductive when the mirror is down.

Immediately to the side of the shutter charging plate cam 26b is provided a second driving lever 30 which is rotatable on a pivot 30a. The second lever has a small roller 30b attached rotatably to its one end, which slides on the cam surface of the plate cam 26b, and a small roller 30c rotatably attached to its other end. In the neighborhood of the mirror 5 there is provided a shutter charging lever 32 which is rotatable on a pivot 32a. A pin 32b which abuts on the small roller 30c of the second driving lever 30 is fixed to the lower end of the lever 32. A connecting pin 32c is also fixed to the upper end of the lever 32. A weak spring 34 is stretched between the lever 32 and an unmovable member not shown, whereby the lever 32 is pulled counterclockwise.

A well-known focal plane shutter 18 is placed in the rear of the rotatable reflex mirror 5. When the lever 32 is rotated clockwise against the force of the spring 34 as the plate cam 26b rotates, the pin 32c pushes up a pin 19a fixed to a shutter charging member 19, thereby charging the shutter.

FIGS. 4A and 4B are enlarged views illustrating the operation of the plate cams 26a and 26b which are integrally attached to the cam driving gear 26. More specifically, FIG. 4A illustrates a viewfinder observing state prior to shutter release, and FIG. 4B illustrates the exposable state in which the reflex mirror 5 has been raised. In FIG. 4A, the first driving lever 29 is rotated clockwise by the force of the mirror lowering spring 235, so that the small roller 29b rests on the lower dead center of the mirror driving plate cam 26a. In this state, the reflex mirror 5 is placed in the viewfinder observing state.

On the other hand, the second driving lever 30 is rotated counterclockwise to retain the shutter-charge completed state, in which the small roller 30b rests on the upper dead center of the shutter charging plate cam 26b.

When the cam driving gear 26 is rotated, as shown in FIG. 4A, in the direction of an arrow by releasing the shutter, the levers 29, 30, 31 and 32 are caused to rotate in respective directions of arrows by the plate cams 26a and 26b, resulting in the state show in FIG. 4B. At this point, the small roller 29b rests on the upper dead center of the mirror driving plate cam 26a. In this state, the reflex mirror 5 is raised against the force of the mirror lowering spring 235, permitting shooting.

At this point, the second lever 30 is rotated clockwise by force of the spring 34, so that the small roller 30b rests on the lower dead center of the shutter charging plate cam 26b. In this state, the shutter 18 is permitted to run.

when the cam driving gear 26 further rotates in the direction of an arrow as shown in FIG. 4B after the shutter has been released and the shutter curtains have run, the plate cams 26a and 26b cause the levers 29, 30, 31 and 32 to rotate in respective directions of arrows. Consequently, the shutter 18 is charged, and the reflex mirror 5 is lowered, resulting in the state shown in FIG. 4A.

FIGS. 5A and 5B are detail diagrams of the mirror-up detecting switch MUSW 28. That is, the switch is composed of a conductive armature 27 attached to the cam driving gear 26, an annular conductor pattern 28a and a partially annular conductor pattern 28b which are both formed on a board 280. The conductor patterns are connected to a CPU 101 shown in FIG. 11. The conductor armature 27 is divided at its end into two parts 27a and 27b which come in contact with and slide on the conductor patterns 28a and 28b, respectively. The part 27a keeps in contact with the conductor pattern 28a all the time regardless of rotation of the gear 26. The other part 27b is adapted to come in contact with the conductor pattern 28b when the shutter-charge is completed and go out of contact with the pattern 28b when the mirror is raised fully. FIG. 5A illustrates the viewfinder observing state prior to shutter release, where the conductor patterns 28a and 28b are electrically connected with each other through the conductive armature 27. FIG. 5B illustrates the shooting state in which the reflex mirror 5 is raised.

FIG. 6 illustrates the driving system 52 for varying focal lengths of the photo-taking lens (zooming) and housing or collapsing the photo-taking lens in the camera body by means of the cam ring 17. In FIG. 6, the cam ring is placed in a wide-angle state. To the periphery of the cam ring 17 is fixed a cam ring gear 51 having a gear portion 51b. The driving system 52 is fixed to the camera body 1.

The driving system 52 is provided with a motor ZMM 53 having a pinion 54 fixed to its rotating shaft. The motor drives the cam ring gear 51 through reduction gears 55 and 56. A zoom switch ZMSW 57 is attached to the periphery of the lens driving cam ring 17 to detect its position. A conductive armature 58 is attached to the camera body 1, which slides on the ZMSW 57. The ZMSW 57 is provided with conductor patterns 57a and 57b which are led to the CPU 101 shown in FIG. 11. The conductive armature 58 is divided at its end into two parts which come in contact with and slide on the ZMSW 57. The conductive armature 58 is designed such that the conductor patterns 57a and 57b are not electrically connected with each other when the cam ring 17 is placed in a focal length set state, but they come in contact with the armature to be electrically connected with each other before the lens interferes with the movable mirror 5 when the cam ring 17 is driven by the driving system 52 in the direction of lens collapse.

FIG. 6 shows a focal length set state in which the conductor patterns 57a and 57b are not electrically connected with each other.

Figure 7:
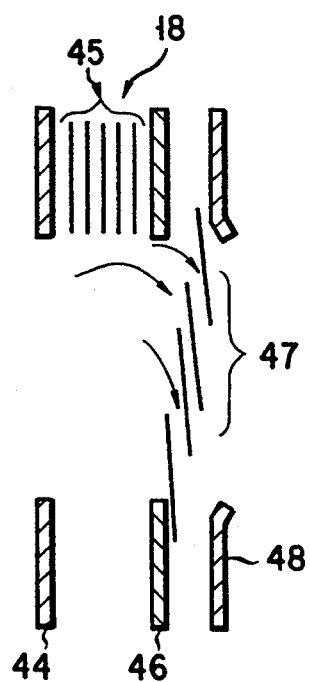
FIG. 7 is a sectional view of a focal plane shutter.

FIG. 7 is a sectional view of the well-known focal plane shutter 18, which is in the non-charged state. The focal plane shutter is composed of a shutter plate 44, a leading-curtain shutter blade group 47, a following-curtain shutter blade group 47, a blade spacer 46 between the shutter blade groups, and a blade presser 48. In the state shown, the following-curtain shutter blades 47 overlap each other, which weakens the effect of interrupting light indicated by arrows. In general single-lens reflex cameras, movable reflex mirrors prevent light as indicated by arrows from directly reaching shutter blades. In the present invention, the same effect can be obtained by fully closing the diaphragm blades at the time of mirror up, which will be described later.

Hereinafter, the operation of the camera constructed as described above will be described. First, a normal shooting sequence will be described with reference to FIG. 1, FIG. 3, FIG. 5, FIGS. 8A through 8N and FIG. 25.

At a time of normal shooting, the photo-taking lens is in the state below the optical axis shown in FIG. 1, i.e., in the viewfinder observing state shown in FIG. 3. When, in this state, a release signal is entered into the CPU 101 shown in FIG. 11m which is produced by a shutter release operation, the CPU energizes leading-curtain and following-curtain holding magnets of the focal plane shutter to place both of the curtains in the held state and rotates the motor SCM 21 clockwise. Thereby, the output gear 22 and the gears 23, 24, 25 and 26 are rotated in respective directions of arrows as shown in FIG. 3. As a result, the shutter 18 is released from the held state by the plate cam 26b in the charge completed state and thus made ready to run, and the movable mirror is raised. At the time when the mirror is raised completely by rotation of the cam driving gear 26, the conductive armature 27 is released from contact with the conductor pattern 28b (refer to FIG. 5B) with the result that the CPU 101 stops the motor SCM 21.

Next, the pulse motor AVM 35 is rotated clockwise to drive the driving wheel 36 in the direction of an arrow shown in FIG. 2B. At a time when the notch 36c of the wheel 36 moves across the switch AvTrSW 38, a trigger signal is produced. A counting operation is started at this point of time, and the motor AVM 35 is stopped at a point of time that an output is received from a well-known aperture setting circuit, thereby providing a desired aperture setting. Next, the shutter magnets are sequentially deenergized to expose film. Subsequently, the pulse motor AVM 35 is rotated counterclockwise to rotate the driving wheel 36 in the opposite direction to the arrow. As a result, the diaphragm blades 37 open from a predetermined aperture to the open side, and the notch 36c of the wheel 36 moves across the AvTrgSW 38 to thereby produce a trigger signal. In response to this trigger signal the motor AVM 35 stops, so that the diaphragm blades return to their initial open position. The CPU 101 next rotates the motor SCM 21 clockwise again. Thereby, the output gear 22 and the gears 23, 24, 25 and 26 are rotated in the respective directions of arrows, so that the movable mirror 5 starts to lower and the shutter 18 starts charging. The further rotation of the cam driving gear 26 permits the protrusion 5c of the movable mirror 5 to turn the MDSW 7 on when the mirror 5 is fully lowered, thereby stopping the motor SCM 21. The film is next wound by means of a film advance mechanism not shown, so that preparation is made for the next shooting.

Figure 23:
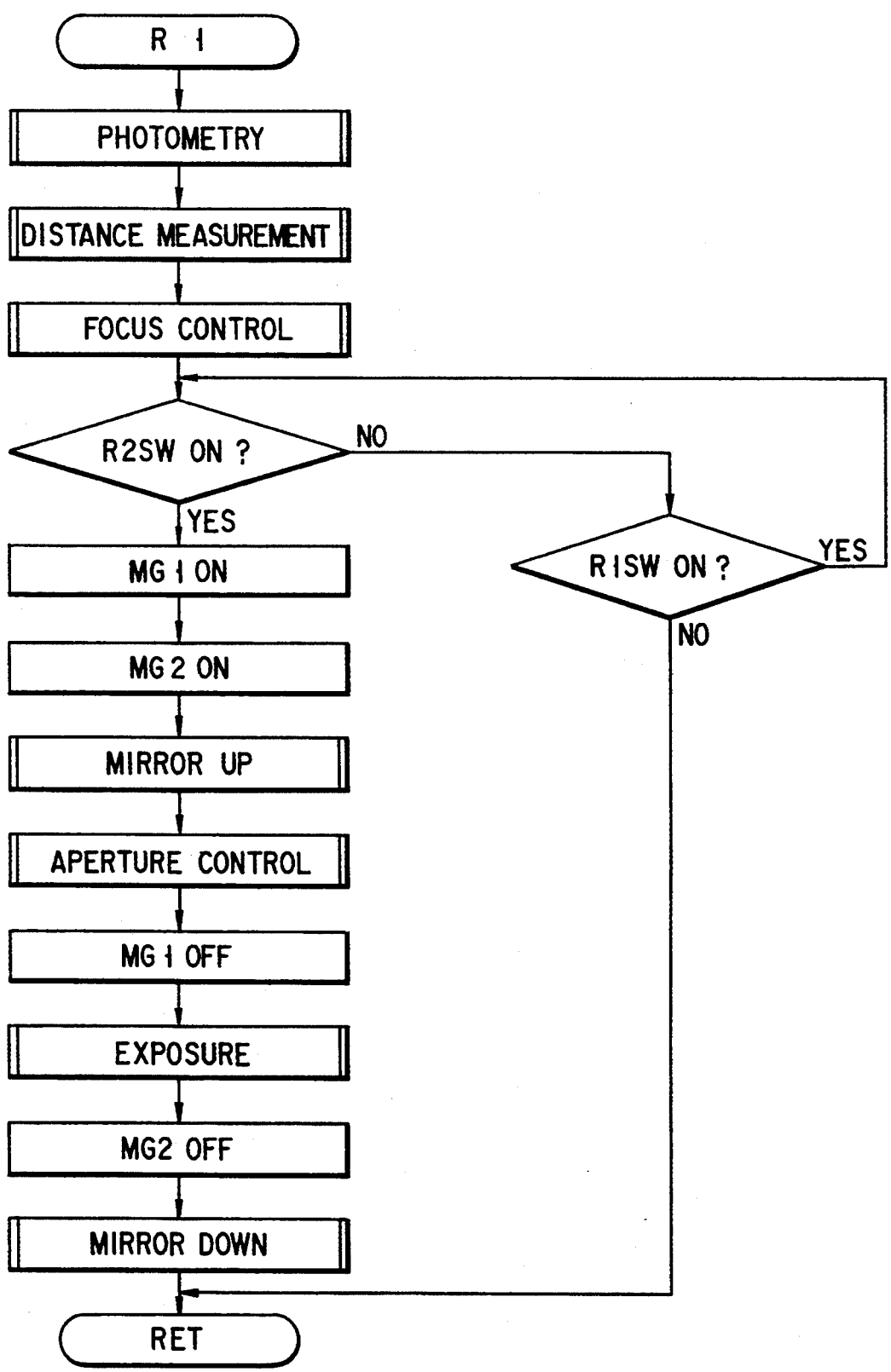
FIG. 23 is a flowchart for a normal shooting sequence.

A flowchart for the above-described normal shooting sequence is shown in FIG. 23. This flowchart conforms to the sequence of FIGS. 8A through 8N.

First, when a first release switch R1SW 113 (refer to FIG. 11) is turned on, photometry, distance measurement and focus control are performed. When a second release switch R2SW 114 is next turned on, the switchover to the exposure sequence is carried out. The magnet MG1 for the leading curtain of the shutter and the magnet MG2 for the following curtain are energized, so that the mirror is raised. When the MG1 is deenergized after aperture setting, the shutter leading curtain runs to initiate exposure. When the MG2 is deenergized after a lapse of a predetermined period of time, the following curtain of the shutter runs to terminate the exposure. Finally, the mirror is lowered, whereby the exposure sequence is terminated. The shutter is charged at about the same time the mirror is lowered.

FIG. 11 is a block diagram of electronic equipment used in the camera of the present invention.

The CPU 101 is equipped with a read only memory (ROM) and carries out the sequential control in accordance with programs stored in the ROM, thereby controlling peripheral equipment such as ICs.

The IFIC 102, serving as an interface, performs serial communication with the CPU 101 to drive mainly the magnets MG1 and MG2 and a motor driver 103. The motor driver 103 is responsive to control signals from the IFIC 102 to directly drive the DC motors and the pulse motor.

The SCM 21, as described in connection with FIG. 3, is a motor for driving the mirror and charging the shutter. The ZMM 53, as described in connection with FIG. 6, a motor for zooming. LDM 108 is a motor for focusing the photo-taking lens on a subject to be photographed. PI 38, as described in connection with FIG. 2A, is a photo interrupter for detecting the position providing the initial aperture, PI 109 is a photo interrupter for detecting an amount of movement of the photo-taking lens, and PI 115 is a photo interrupter for detecting an amount of movement of the lens barrel. The PIs provide outputs AVTRG, LDP and ZMP.

The MG1 and MG2 are magnets for arresting the leading and following curtains of the focal plane shutter 18. With the shutter charged, when the MG1 and MG2 are deenergized in sequence, the leading and following curtains will run in sequence.

ZMSW 57 is a switch which is turned on when the lens barrel stays in shooting position and turned off when it is in the collapsed position. MUSW 28 is a switch which is turned off when the mirror is up, while MDSW 7 is a switch which is turned on when the mirror is down.

PWSW 112 is a power switch of the camera. R1SW 113 is the first release switch which, when turned on, permits photometry, distance measurement and focus control. R2SW 114 is the second release switch which, when turned on, permits shooting with a predetermined exposure value.

Hereinafter, the lens collapsing operation of the first embodiment will be described mainly with reference to FIGS. 9A through 9N. Upon receipt of a collapse signal resulting from turning the PWSW 112 of FIG. 11 off, the CPU 101 first drives the focusing lens to infinity in order to improve camera's capacity for lens collapse. The pulse motor AVM 35 is next rotated clockwise to drive the driving wheel 36 in the direction of the arrow. From when the notch 36c of the wheel 36 moves across the PI 38, and thus a trigger signal is produced, time count operation is started to stop the diaphragm blades down to the light interrupting position.

Subsequently, the motor SCM 21 is rotated clockwise with the two magnets associated with the focal plane shutter deenergized. Thereby, the output gear 22, and the gears 23, 24, 25 and 26 are rotated in the respective directions of arrows. As a result, the switchover of the shutter to the non-charged state is carried out by the resiliency of charged spring. Note that the plate cam 26b is shaped so that the shutter blades will not be caused to run freely by means of spring force at the time of the switchover. That is, the plate cam 26b permits the second driving lever 30 and the shutter charging lever 32 to rotate gradually. Thus, the shutter blades will also move gradually. Thus, the generation of shutter noise, shock. etc., can be prevented to the utmost. At this point, the mirror is being raised by the rotation of the plate cam 26a. When the mirror is raised by the rotation of the cam driving gear 26, the conductive armature 27 is released from contact with the conductor pattern 28b of the MUSW 28 is released (refer to FIG. 5B), so that the CPU 101 stops the motor SCM 21.

Next, the drive motor ZMM 53 is rotated in the direction that collapses the lens. Thereby, the output gear 54 and the gears 55 and 56 are rotated to rotate the cam ring gear 51. Thus, the first-lens-group driving frame 14, the second-lens-group frame 12 and the collapsing frame 9 move along the cam groove holes 17c, 17b and 17c, respectively, resulting in the lens collapsed state above the lens optical axis shown in FIG. 1. In the collapse completed state, the stopper pin 48 has come into the notch 36d of the drive wheel 36 as shown in FIGS. 2A and 10C, thereby restricting the rotation of the drive wheel 36 from the light interrupting position in the direction that opens the lens aperture.

Figure 19:
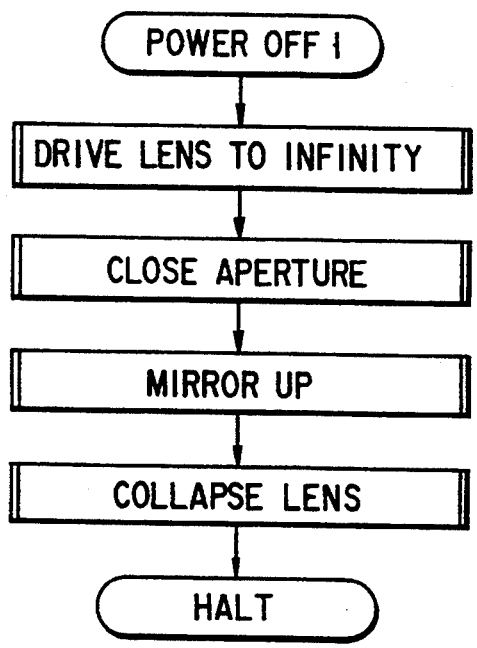
FIG. 19 is a flowchart for the operation of the first embodiment.

FIG. 19 is a flowchart illustrating the operation of the first embodiment of the present invention. This flowchart conforms to the sequence shown in FIGS. 9A through 9N. The flowchart illustrates the sequence of operations of, after power off, setting the lens to infinity, fully closing the aperture, raising the lens, and then collapsing the lens while the pin 49 is coming into the notch 36d of the drive wheel 36. In the HALT state, the CPU 101 stops oscillation for power saving, or even if the CPU performs an oscillating operation, programs will not be carried out. The detail operations of closing the aperture, raising the mirror, and collapsing the lens are illustrated by subroutines shown in FIGS. 14 through 18. Hereinafter, these subroutines will be described.

Figure 14:
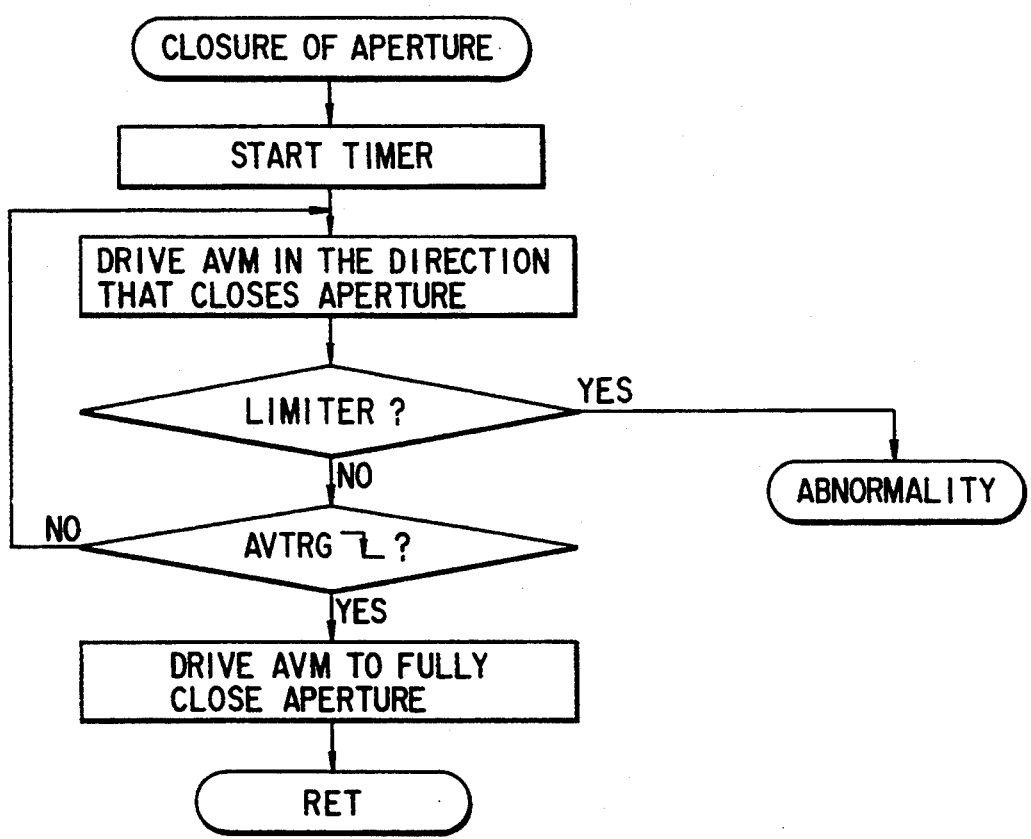
FIG. 14 is a flowchart for the operation of closing the diaphragm.

First, reference will be made to FIG. 14 to describe the operation to close the aperture in order to interrupt light entering the camera body through the photo-taking lens when the lens barrel is collapsed in the camera body.

A timer is started to drive the AVM 35 from the aperture full-open position in the direction that close the aperture. After the aperture's full-open position detect signal AVTR is switched from a H level to a L level, the AVM 35 is driven by an angle of rotation that has been determined previously so as to close the aperture fully. Here, if the AVTG makes no change during a predetermined period after the driving of the AVM 35 has been started, it is decided that the diaphragm is abnormal.

Figure 15:
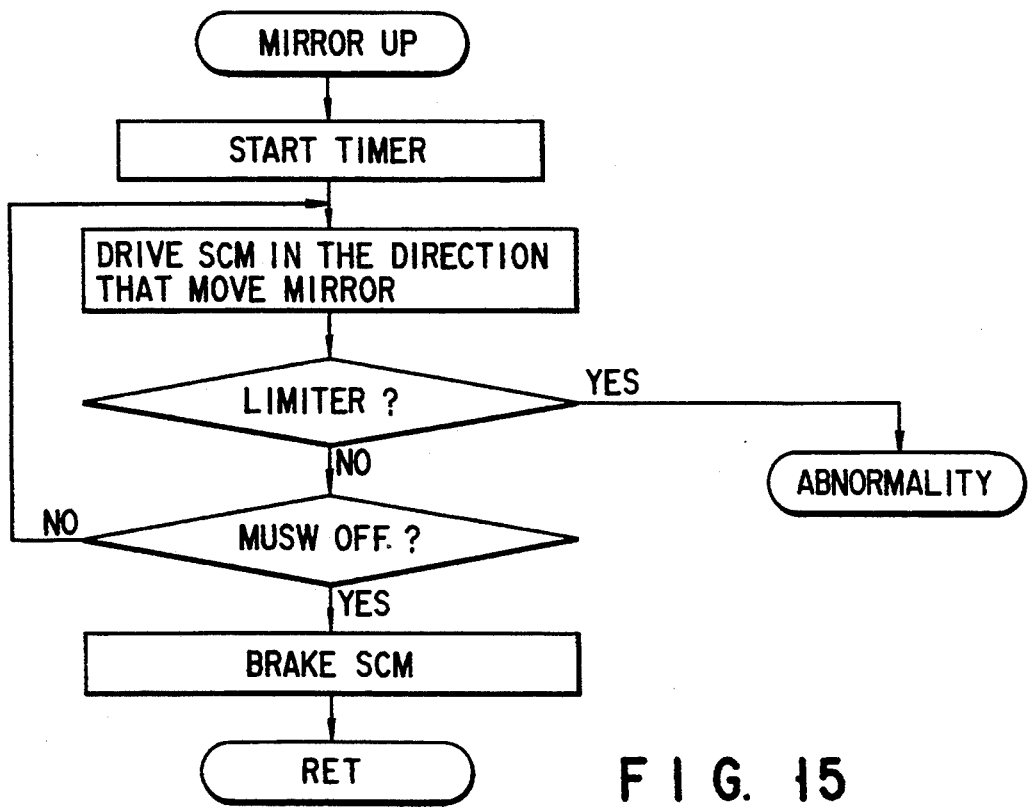
FIG. 15 is a flowchart for the mirror up operation.

Reference will be made to FIG. 15 to describe the mirror-up operation. The timer is started to drive the SCM 21 in the direction that raises the mirror. When the MUSW is turned off, the motor SCM 21 is braked. If the MUSW does not turn off even after a lapse of a predetermined time from when the motor SCM 21 is started, it is decided that the mirror is driven abnormally.

Figure 16:
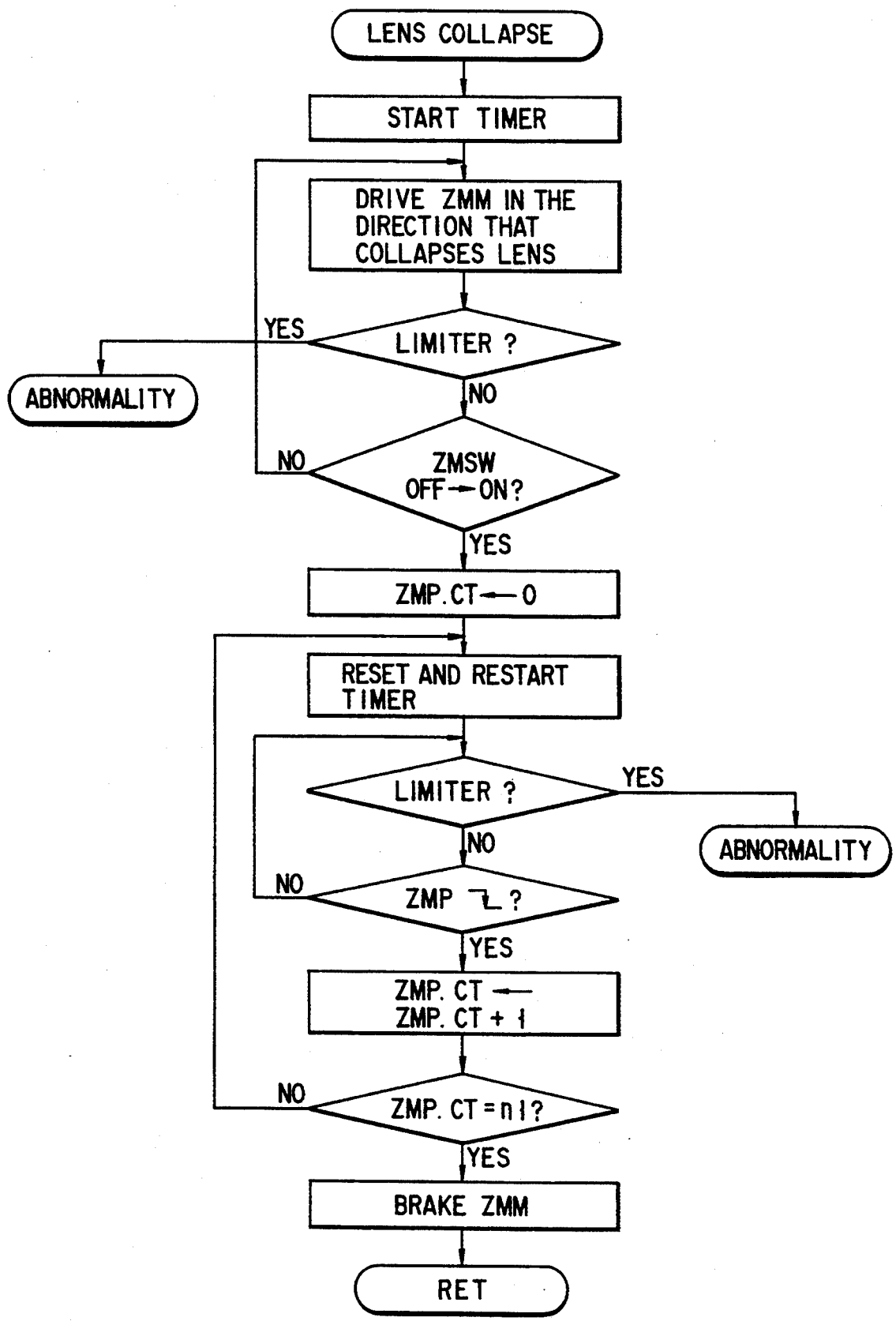
FIG. 16 is a flowchart for the operation of collapsing the photo-taking lens barrel.

Next, reference will be made to FIG. 16 to describe the operation to collapse the photo-taking lens barrel. It is here supposed that the photo-taking lens barrel is stopped in a shooting position. The collapsing operation is performed when the PWSW 112 is switched from ON to OFF.

First, the timer is started to drive the motor ZMM 53 in the direction that collapses the photo-taking lens. When the ZMSW is switched from OFF to ON, a counting operation for output pulses of the PI 115 is started. If, at this point, the ZMSW is not switched from OFF to ON during a predetermined time from when the motor ZMM is started, it is decided that the zooming operation is abnormal. A PI 115 pulse counter ZMP.CT is cleared and the timer is reset for restart. Every time an output pulse ZMP of the PI 115 falls, the counter ZMP.CT counts up. When a predetermined number is reached by the count in the counter ZMP.CT, the motor ZMM 53 is braked to stop the collapsing operation. If the ZMP does not fall even after a lapse of a predetermined time, it is decided that the zooming operation is abnormal.

Reference will be made to FIG. 17 to describe the operation to set the focusing lens to infinity. The timer is fist reset and started, and the motor LDM 108 is then driven in the direction that sets the lens to infinity. Every time the lens-drive-amount pulse LDP falls, the timer is reset. If the fall of the pulse LDP does not occur for a predetermined period of time, it is decided that the focusing lens has been set to infinity. In that case, the motor LDM 108 is stopped.

The operation to set the focusing lens to the closest focusing distance shown in FIG. 18 is the same as the operation to set the lens to infinity shown in FIG. 17 except that the motor LDM 108 is rotated in the opposite direction.

Figure 20:
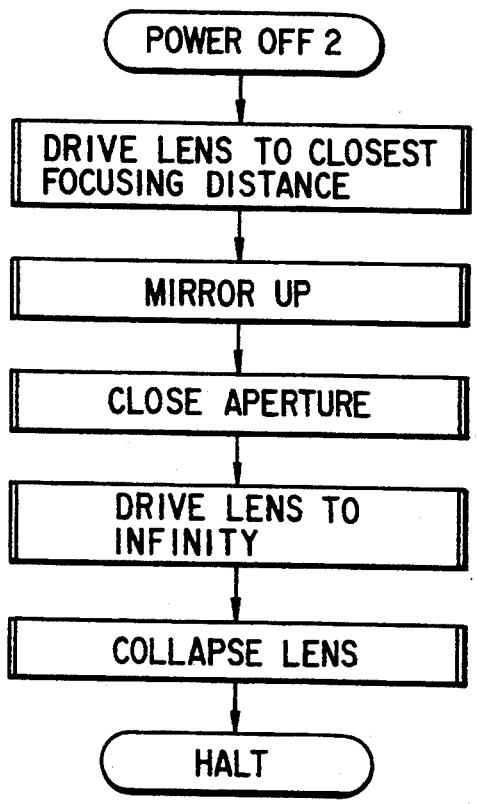
FIG. 20 is a flowchart for the operation of the second embodiment.

FIG. 20 is a flowchart for the operation of a second embodiment of the present invention. The second embodiment is identical in construction with the first embodiment but differs in the way of control as shown in FIG. 20. That is, the control is performed in the order of setting of the lens to the closed focusing distance, mirror-up, closing of the aperture, setting of the lens to infinity, collapsing of the lens, and CPU HALT. The reason why the lens is first set to the closest focusing distance is to protect the curtains of the focal plane shutter against burning which may arise from sunlight being focused on those curtains through the photo-taking lens because the aperture is closed after mirror-up operation. The subroutines of the control operations are the same as those in the first embodiment. Furthermore, as is the case with the first embodiment, the conductive armature 27 is released from contact with the conductor pattern 28b.

FIGS. 12 and 13 are diagrams for use in explanation of the way of protecting the mirror from destruction at the time of lens collapse.

There is a possibility that the mirror may be destroyed when the lens is collapsed in the mirror down state or the mirror is lowered in the lens collapsed state. Such operations as destroy the mirror cannot be performed in the sequence. However, the problem may arise in case where a malfunction of the CPU 101 controlling all the operations occurs because of external noise, static electricity, etc. Therefore, it is required to disable the destruction mode by means of hardware.

First, a switch status table of the switch ZMSW for detecting the collapse of the lens barrel and the switch MUSW for detecting the mirror up will be described with reference to FIG. 12. When the ZMSW is in the ON state, the lens barrel is in collapsed position. When it is in the OFF state, on the other hand, the barrel is in shooting position. When the MUSW is OFF, the mirror is in the up state. In the mirror-up state, the mirror is evacuated from within the mirror box to the place where it does not interfere with the collapse of the lens barrel.

In order to protect the mirror against destruction, the ZMSW and MUSW switch state signals are utilized. With the MUSW ON (the mirror is down) and when the ZMSW is switched from OFF to ON, that is, when the lens barrel stays in the collapsed area with the mirror down, the motor ZMM 53 for driving the lens barrel is disabled from rotating in the direction that collapses the lens barrel. Also, with the ZMSW ON, that is, when the lens barrel stays in the collapsed area, the motor SCM 21 for driving the mirror is disabled from rotating in the direction that lowers the mirror.

FIG. 13 illustrates the motor driver circuit and the internal logic circuit of the IFIC 102 associated with the motor driver.

A shift register 130 is an 8-bit latch for holding a serial signal transmitted from the CPU 101, which comprises control signals for the lens driving motor ZMM and the shutter charging and mirror driving motor SCM. Usually, the bit stages P0, P1, N0, N1, P2, P3, N2 and N3 of the latch are all set to 0s. Upon receipt of motor driving instructions from the CPU 101, the bit stages are selectively set to 1s. ZMM motor driving transistors PNP0, PNP1, NPN0, and NPN1, and SCM motor driving transistors PNP2, PNP3, NPN2, and NPN3 are selectively rendered conductive in accordance with output states of the 8-bit latch depending on control signals from the CPU 101. For example, in order to collapse the lens, the output state of the 8-bit latch is set so that only the transistors PNP0 and NPN0 will be rendered conductive. In order to drive the mirror, only the transistors PNP2 and NPN2 are rendered conductive.

NAND gates 131, 132, 133, and 134 are gate circuits adapted to disable paired transistors PNP0 and NPN1, PNP1 and NPN0, PNP2 and NPN3, and PNP3 and NPN2 from conducting simultaneously. That is, the gate circuits serve to prevent the power supply from becoming short-circuited, thus protecting the driver transistors from thermal destruction.

Predriver circuits 150 and 151 are responsive to a signal at a HIGH level on each input line thereto to render a corresponding one of the driver transistors conductive.

A register 141 is a latch adapted to store the respective states of the switches ZMSW and MUSW. When the switches ZMSW and MUSW are ON, corresponding bit stages are sets to 1s. When they are OFF, the stages are set to 0s. The register has a function of transferring the switch logic to the CPU 101 in serial fashion in response to a sync signal from the CPU. With the above arrangement, when the lens barrel is collapsed, the output state of the 8-bit latch is set so as to drive the transistors PNP0 and NPN0 ON only while the motor ZMM is rotated by an amount of rotation required to collapse the lens. When the lens collapse is completed, the outputs of the latch are all resets to 0s to thereby turn the above transistors OFF.

On the other hand, when the lens collapse is not allowed, that is, when the lens barrel is moved inward in the state where the mirror is down and thus the switch MUSW is ON, the NAND gate 136 and an AND gate 137 disable the driver transistor PNP0 from conducting when the switch ZMSW is turned ON. The motor ZMM is therefore disabled from rotating in the direction that collapses the lens. When the switch ZMSW is ON, on the other hand, an AND gate 139 disables the driver transistor PNP2 from conducting. The motor SCM is therefore disabled from rotating in the direction that drives the mirror.

FIG. 2B illustrates a third embodiment of the present invention which is distinct from the first and second embodiments in that the collapsing frame 9 is provided with a stopper pin 50. This stopper pin comes into the notch 36d of the drive wheel 36 when the lens is placed in shooting state, thereby setting the lens aperture between the maximum aperture and the minimum aperture. That is, the drive wheel 36 is disabled from rotating up to the light interrupting position where the lens aperture is fully closed. Even if the aperture control malfunctions with disturbance noise, therefore, the film will not remain unexposed. In the shooting state, as shown in FIGS. 10A, 10B and 10C, the stopper pin 50, serving as an aperture range restricting pin, comes into the notch 36d of the wheel 36, thereby restricting the rotation of the wheel 36 within the range from the open aperture setting to the minimum aperture setting. That is, the wheel 36 is not allowed to rotate up to a position where light is interrupted. This will prevent film from remaining unexposed even if the aperture control malfunctions due to disturbance noise or the like.

Hereinafter, the lens collapsing operation in the third embodiment will be described with reference to a flowchart shown in FIG. 21. In the third embodiment, the flow of control is as follows: setting the lens to the closest focusing distance, mirror up, collapse of the lens, closing the aperture, setting the lens to infinity, and CPU101 HALT. In shooting state, upon receipt of a collapse signal from the PWSW 112 of FIG. 11, the CPU 101 first makes the spacing between the second-lens-group frame 12 and the collapsing frame 9 larger than that at the time of zooming. That is, the stopper pin 50 comes off the notch 36d of the drive wheel 36.

The CPU 101 next rotates the motor 21 clockwise without energizing the two magnets associated with the focal plane shutter 18. Thereby, the output gear 22 and the gears 23, 24, 25 and 26 are rotated in the respective directions indicated by arrows. As a result, the switchover of the shutter to the non-charged state is carried out by the resiliency of the charged spring. In this case, the free running of the shutter blades due to spring force is disabled by the shape of the plate cam 26b. Thus, shutter noise, shock and the like will be suppressed to the utmost.

Simultaneously with the switchover of the shutter to the charged state, the movable mirror 5 is being raised by the plate cam 26a. When the mirror is raised up, the conductive armature 27 is released from connection with the conductor pattern 28b on the board 280 (refer to FIG. 5B). Thus, the CPU 101 stops the motor 21 and rotates the drive motor ZMM 53 in the direction that collapses the lens. Thereby, the output gear 39 and the gears 40 and 41 rotates to rotate the cam ring gear 51. Thus, the cam ring 17 is rotated so that the first-lens-group 14, the second-lens-group 12 and the collapsing frame 9 move along the cam slots 17c, 17b and 17c of the cam ring. Finally, the AVM 35 is rotated clockwise to thereby rotate the drive wheel 36 in the direction of arrow. As a result, the notch 36c of the drive wheel 36 moves across the PI 38 to produce a trigger signal, thereby fully closing the diaphragm blades. Subsequently, the spacing between the second-lens-group frame 12 and the first-lens-group drive frame 14 is made small, so that the stopper pin 49 comes into the notch 36d. Thereby, the drive wheel 36 is disabled from rotating from the light interrupting position. When the AVM 35 drives the cam ring 36, the lens spacing is held at a predetermined distance by stopping the drive motor ZMM 53 or by the cam slots 17c, 17b and 17c of the cam ring 17. The subroutines and the disable circuit are the same as those in the first embodiment.

FIG. 22 is a flowchart for the operation of a fourth embodiment of the present invention. The fourth embodiment is identical in structure to the third embodiment but differs in the way of control. The operation is described below with reference to FIG. 22.

When a collapse signal is input from the CPU 101, the focusing lens is set to the closest focusing distance and then, after the mirror is raised, the photo-taking lens groups are collapsed to a position where the switch ZMSW 57 is turned ON. The position where the ZMSW 57 is switched from OFF to ON is the initial position for lens retraction. In this position the stopper pin of FIG. 2B comes off the notch 36d of the drive wheel 36. Next, the aperture is closed fully, the focusing lens is driven to infinity, and the lens groups are collapsed completely. At this point, the stopper pin 49 of FIG. 2B comes into the notch 36d and arrested in the fully closed state of the aperture. In the fourth embodiment as well, the conductive armature 27 is released from connection with the conductor pattern 28b when the movable mirror is raised.

The collapse operation when the switch PWSW is OFF was mainly described herein. When the switch PWSW is ON, the lens is moved outward from the collapsed position to the wide-angle position. The order of executing steps in the sequence in this case may be the reverse of the order in which the steps are performed at the time of collapse. Though not described in particular, therefore, the sequence can be carried out easily.

According to the present invention, as described above in detail, the mirror up and lens collapse can be carried out electrically without producing shutter noise, allowing users to use the camera pleasantly.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A collapsible-lens camera comprising:
 a lens barrel which is movable in a forward direction from the camera when the camera is in use, and at least part of which is collapsed within said camera when said camera is not in use;
 a shutter release button which is operable for executing a shooting operation of said camera;
 a focal plane shutter having leading and following curtains;
 electromagnets for controlling the leading and following curtains of the focal plane shutter, respectively, said electromagnets being in a nonconductive state before the shutter release button is operated, and being set in a conductive state when the shutter release button is operated;
 a movable reflex mirror which is movable between a raised and a lowered position;
 a mirror-driving mechanism for raising or lowering the movable reflex mirror when a shooting operation of said camera is executed and when the lens barrel is collapsed within said camera;
 a shutter charging mechanism for moving the focal plane shutter in a charging direction in synchronism with an operation in which the movable reflex mirror is lowered by the mirror-driving mechanism, and for moving the focal plane shutter in a discharging direction in synchronism with an operation in which the movable reflex mirror is raised by the mirror-driving mechanism, said shutter charging mechanism including a rotatable cam member, and a coupling device having one end which is in elastic contact with the cam member and another end which is coupled to the focal plane shutter, said cam member being smoothly curved at portions where said cam member is in elastic contact with the coupling device; and
 a control circuit for stopping a supply of a current to the leading-curtain controlling electromagnet when the movable reflex mirror is being raised in response to an operation of the shutter release button, for stopping a supply of a current to the following-curtain controlling electromagnet when a predetermined time corresponding to a brightness of an object to be photographed has elapsed, and for preventing a current from being supplied to the leading- and following-curtain controlling electromagnets when the movable reflex mirror is moved upward in response to a collapsing operation of the lens barrel,
 whereby the shutter operates while keeping elastic contact with a cam surface by means of the coupling device when the lens barrel is collapsed, and said shutter is shifted to a non-charge state, with a closed state maintained.

2. A collapsible-lens camera according to claim 1, wherein said mirror-driving mechanism includes a further rotatable cam member, and a further coupling device having one end which is in elastic contact with the further cam member and another end which is coupled to the movable reflex mirror.

3. A collapsible-lens camera according to claim 1, wherein the cam member of the shutter charging mechanism and the cam member of the mirror-driving mechanism are pivotally supported on a single shaft.

4. A collapsible-lens camera according to claim 3, further comprising a switch provided on the single shaft on which the cam member of the shutter charging mechanism and the cam member of the mirror-driving mechanism are pivotally supported for detecting a position of the movable reflex mirror.

5. A collapsible-lens camera according to claim 2, wherein each of the coupling device of the shutter charging mechanism and the coupling member of the mirror-driving mechanism includes a pair of rotatable levers which cross each other at right angles.

6. A collapsible single-lens reflex camera wherein at least part of a photographing lens is received in a space created inside the camera when a movable reflex mirror in the camera is raised, said camera comprising:
- a focal plane shutter including a leading-curtain and a following-curtain;
- an electric motor;
- a mirror-driving mechanism coupled to the electric motor for receiving a driving force from the electric motor and for raising or lowering the movable reflex mirror when a shooting operation of said camera is executed and when the lens barrel is collapsed within said camera;
- a shutter charging mechanism for switching the focal plane shutter from a non-charged state to a charged state, said shutter charging mechanism including a shutter charge cam which is rotated in response to a driving force from the electric motor, and a shutter charge member which follows movement of the shutter charge cam in elastic contact therewith, said shutter charge cam having a smoothly-curving surface;
- a charge releasing mechanism for gradually switching the focal plane shutter from the charged state to the non-charged state by smoothly moving the shutter charge member along the smoothly-curving surface of the shutter charge cam in accordance with an upward movement of the movable reflex mirror; and
- an electromagnetic holding mechanism for electromagnetically holding the shutter in a charged state prior to the upward movement of the movable reflex mirror at the time of an exposure operation of said camera, thereby invalidating a charge-releasing operation performed by the charge releasing mechanism.

7. A collapsible-lens camera comprising:
- a lens barrel which is movable in a forward direction from the camera when the camera is in use, and at least part of which is collapsed within said camera when said camera is not in use;
- a shutter release button which is operable for executing a shooting operation of said camera;
- a focal plane shutter having leading and following curtains;
- electromagnets for controlling the leading and following curtains of the focal plane shutter, respectively, said electromagnets being in a nonconductive state before the shutter release button is operated, and being set in a conductive state when the shutter release button is operated;
- a movable reflex mirror which is movable between a raised and a lowered position;
- a mirror-driving mechanism for raising or lowering the movable reflex mirror when a shooting operation of said camera is executed and when the lens barrel is collapsed within said camera;
- a shutter charging mechanism for moving the focal plane shutter in a charging direction in synchronism with an operation in which the movable reflex mirror is lowered by the mirror-driving mechanism, and for moving the focal plane shutter in a discharging direction in synchronism with an operation in which the movable reflex mirror is raised by the mirror-driving mechanism, said shutter charging mechanism including a rotatable cam member, and a coupling device having one end which is in elastic contact with the cam member and another end which is coupled to the focal plane shutter, said cam member being smoothly curved at portions where said cam member is in elastic contact with the coupling device;
- a control circuit for stopping a supply of a current to the leading-curtain controlling electromagnet when the movable reflex mirror is being raised in response to an operation of the shutter release button, for stopping a supply of a current to the following-curtain controlling electromagnet when a predetermined time corresponding to a brightness of an object to be photographed has elapsed, and for preventing a current from being supplied to the leading- and following-curtain controlling electromagnets when the movable reflex mirror is moved upward in response to a collapsing operation of the lens barrel;
- a detector for detecting a position of the lens barrel; and
- means, responsive to an output from said detector, for preventing the movable reflex mirror from being moved,
- whereby the shutter operates while keeping elastic contact with a cam surface by means of the coupling device when the lens barrel is collapsed, said shutter is shifted to a non-charge state, with a closed state maintained, and when the lens barrel is detected as being located at the collapsed position, the movable reflex mirror is prevented from being moved.

8. A collapsible-lens camera comprising:
- a lens barrel which is movable in a forward direction from the camera when the camera is in use, and at least part of which is collapsed within said camera when said camera is not in use;
- a shutter release button which is operable for executing a shooting operation of said camera;
- a focal plane shutter having leading and following curtains;
- electromagnets for controlling the leading and following curtains of the focal plane shutter, respectively, said electromagnets being in a nonconductive state before the shutter release button is operated, and being set in a conductive state when the shutter release button is operated;
- a movable reflex mirror which is movable between a raised and a lowered position;
- a mirror-driving mechanism for raising or lowering the movable reflex mirror when a shooting operation of said camera is executed and when the lens barrel is collapsed within said camera;
- a shutter charging mechanism for moving the focal plane shutter in a charging direction in synchronism with an operation in which the movable reflex mirror is lowered by the mirror-driving mechanism, and for moving the focal plane shutter in a discharging direction in synchronism with an operation in which the movable reflex mirror is raised by the mirror-driving mechanism, said shutter charging mechanism including a rotatable cam member, and a coupling device having one end which is in elastic contact with the cam member and another end which is coupled to the focal plane shutter, said cam member being smoothly curved at portions where said cam member is in elastic contact with the coupling device;
- a control circuit for stopping a supply of a current to the leading-curtain controlling electromagnet when the movable reflex mirror is being raised in response to an operation of the shutter release button, for stopping a supply of a current to the following-curtain controlling electromagnet when a predetermined time corresponding to a brightness of an object to be photographed has elapsed, and for preventing a current from being supplied to the leading- and following-curtain controlling electromagnets when the movable reflex mirror is moved upward in response to a collapsing operation of the lens barrel;

a diaphragm arranged inside the lens barrel and being switchable between a fully-open state and a fully-closed state; and diaphragm maintaining means for maintaining the diaphragm in the fully-closed state when the lens barrel is collapsed whereby the shutter operates while keeping elastic contact with a cam surface by means of the coupling device when the lens barrel is collapsed, and said shutter is shifted to a non-charge state, with a closed state maintained, and the diaphragm is set in the fully-closed state.

9. A collapsible-lens camera comprising:

a lens barrel which is movable in a forward direction from the camera when the camera is in use, and at least part of which is collapsed within said camera when said camera is not in use;

a shutter release button which is operable for executing a shooting operation of said camera;

a focal plane shutter having leading and following curtains;

electromagnets for controlling the leading and following curtains of the focal plane shutter, respectively, said electromagnets being in a nonconductive state before the shutter release button is operated, and being set in a conductive state when the shutter release button is operated;

a movable reflex mirror which is movable between a raised and a lowered position;

a mirror-driving mechanism for raising or lowering the movable reflex mirror when a shooting operation of said camera is executed and when the lens barrel is collapsed within said camera;

a shutter charging mechanism for moving the focal plane shutter in a charging direction in synchronism with an operation in which the movable reflex mirror is lowered by the mirror-driving mechanism, and for moving the focal plane shutter in a discharging direction in synchronism with an operation in which the movable reflex mirror is raised by the mirror-driving mechanism, said shutter charging mechanism including a rotatable cam member, and a coupling device having one end which is in elastic contact with the cam member and another end which is coupled to the focal plane shutter, said cam member being smoothly curved at portions where said cam member is in elastic contact with the coupling device;

a control circuit for stopping a supply of a current to the leading-curtain controlling electromagnet when the movable reflex mirror is being raised in response to an operation of the shutter release button, for stopping a supply of a current to the following-curtain controlling electromagnet when a predetermined time corresponding to a brightness of an object to be photographed has elapsed, and for preventing a current from being supplied to the leading- and following-curtain controlling electromagnets when the movable reflex mirror is moved upward in response to a collapsing operation of the lens barrel;

a first detector for detecting a position of the lens barrel;

a second detector for detecting a position of the movable reflex mirror; and means for preventing the lens barrel from being collapsed when the second detector detects that the movable reflex mirror is not at an upper position, whereby the shutter operates while keeping elastic contact with a cam surface by means of the coupling device when the lens barrel is collapsed, and said shutter is shifted to a non-charge state, with a closed state maintained, and the lens barrel is prevented from being collapsed when the movable reflex mirror is not at said upper position.

* * * * *